US010483786B2

(12) United States Patent
Moussaoui et al.

(10) Patent No.: US 10,483,786 B2
(45) Date of Patent: Nov. 19, 2019

(54) WIRELESS CHARGING SYSTEMS WITH MULTICOIL RECEIVERS

(71) Applicant: Apple Inc., Cupertino, CA (US)

(72) Inventors: Zaki Moussaoui, San Carlos, CA (US); Rohan Dayal, Mountain View, CA (US); Weihong Qiu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 15/473,453

(22) Filed: Mar. 29, 2017

(65) Prior Publication Data

US 2018/0013310 A1 Jan. 11, 2018

Related U.S. Application Data

(60) Provisional application No. 62/359,064, filed on Jul. 6, 2016.

(51) Int. Cl.
*H02J 50/40* (2016.01)
*H02J 7/02* (2016.01)
*H02J 7/34* (2006.01)

(52) U.S. Cl.
CPC .............. *H02J 7/025* (2013.01); *H02J 50/40* (2016.02); *H02J 7/345* (2013.01)

(58) Field of Classification Search
CPC .................................. H02J 7/345; H02J 50/90
USPC .................................. 320/108, 115, 140, 163
See application file for complete search history.

(56) References Cited

U.S. PATENT DOCUMENTS

| | | | |
|---|---|---|---|
| 9,129,741 B2 | 9/2015 | Tseng | |
| 9,209,627 B2 | 12/2015 | Baarman et al. | |
| 9,275,791 B2 | 3/2016 | Wheatley, III et al. | |
| 2013/0043734 A1 | 2/2013 | Stone et al. | |
| 2013/0119773 A1 | 5/2013 | Davis | |
| 2015/0236513 A1* | 8/2015 | Covic .................... | H02J 7/025 307/104 |

(Continued)

FOREIGN PATENT DOCUMENTS

| | | |
|---|---|---|
| EP | 2555377 | 2/2013 |
| WO | 2013122483 | 8/2013 |

(Continued)

*Primary Examiner* — Edward Tso
*Assistant Examiner* — Aaron Piggush
(74) *Attorney, Agent, or Firm* — Treyz Law Group, P.C.; G. Victor Treyz; Joseph F. Guihan

(57) ABSTRACT

A wireless power transmitting device may have an array of transmitting coils to transmit power wirelessly to a wireless power receiving device having an array of wireless power receiving coils. The receiving device may have a rectifier that receives alternating-current signals from the wireless power receiving coils and provides corresponding rectified direct-current voltage signals to a capacitor and other circuitry. The rectifier circuitry may include bridge circuits each of which is coupled between a respective coil in the array of wireless power receiving coils and the capacitor. The wireless power transmitting coils may be arranged in a hexagonally tiled array. The wireless power receiving coils may include first, second, and third coils that are aligned with respective vertices in an equilateral triangle having sides with lengths equal to half of the center-to-center spacing of the hexagonally tiled transmitting coils.

12 Claims, 4 Drawing Sheets

(56) References Cited

U.S. PATENT DOCUMENTS

2015/0280442 A1* 10/2015 Graham ................ H02J 7/0042
307/31
2016/0189861 A1 6/2016 Nam et al.

FOREIGN PATENT DOCUMENTS

WO 2016005984 1/2016
WO 2016024869 2/2016

* cited by examiner

WIRELESS CHARGING SYSTEMS WITH MULTICOIL RECEIVERS

This application claims the benefit of provisional patent application No. 62/359,064, filed Jul. 6, 2016, which is hereby incorporated by reference herein in its entirety.

FIELD

This relates generally to charging systems, and, more particularly, to systems for charging electronic devices.

BACKGROUND

In a wireless charging system, a wireless charging mat may wirelessly transmit power to a portable electronic device that is placed on the mat. A portable device may have a receiving coil and rectifier circuitry for receiving wireless alternating-current (AC) power from a coil in the wireless charging mat that is overlapped by the receiving coil. The rectifier converts the received AC power into direct-current (DC) power.

Charging efficiency may not be as high as desired with this type of wireless charging arrangement. There may also be a relatively large amount of cost and complexity associated with forming coils in a wireless charging mat.

SUMMARY

A wireless power transmitting device may transmit power wirelessly to a wireless power receiving device. The wireless power transmitting device may be a wireless charging mat or other equipment with an array of wireless power transmitting coils. The wireless power receiving device may be a portable electronic device with a battery, an array of wireless power receiving coils that receive wireless power from the array of wireless power transmitting coils, and a rectifier that receives alternating-current signals from the wireless power receiving coils and provides corresponding rectified direct-current voltage signals to circuitry in the wireless power receiving device.

The wireless power receiving device may include a capacitor that receive the direct-current voltage signals and may include charging circuitry that charges a battery using these signals. The rectifier circuitry may include multiple bridge circuits each of which is coupled between a respective coil in the array of wireless power receiving coils and the capacitor.

The wireless power transmitting coils may be arranged in a hexagonally tiled array. The wireless power receiving coils may include first, second, and third coils that are arranged so that the second and third coils are not aligned with any of the transmitting coils when the first coil is aligned with one of the transmitting coils. The receiving coils may be aligned with respective vertices in an equilateral triangle having sides with lengths equal to half of the center-to-center spacing of the hexagonally tiled transmitting coils.

DETAILED DESCRIPTION

A wireless power system may have a wireless power transmitting device such as a wireless power adapter or other wireless power transmitting equipment. The wireless power transmitting device may wirelessly transmit power to a wireless power receiving device such as a wristwatch, cellular telephone, tablet computer, laptop computer, or other electronic equipment. The wireless power receiving device may use power from the wireless power transmitting device for powering the device and for charging an internal battery.

Figure 1:
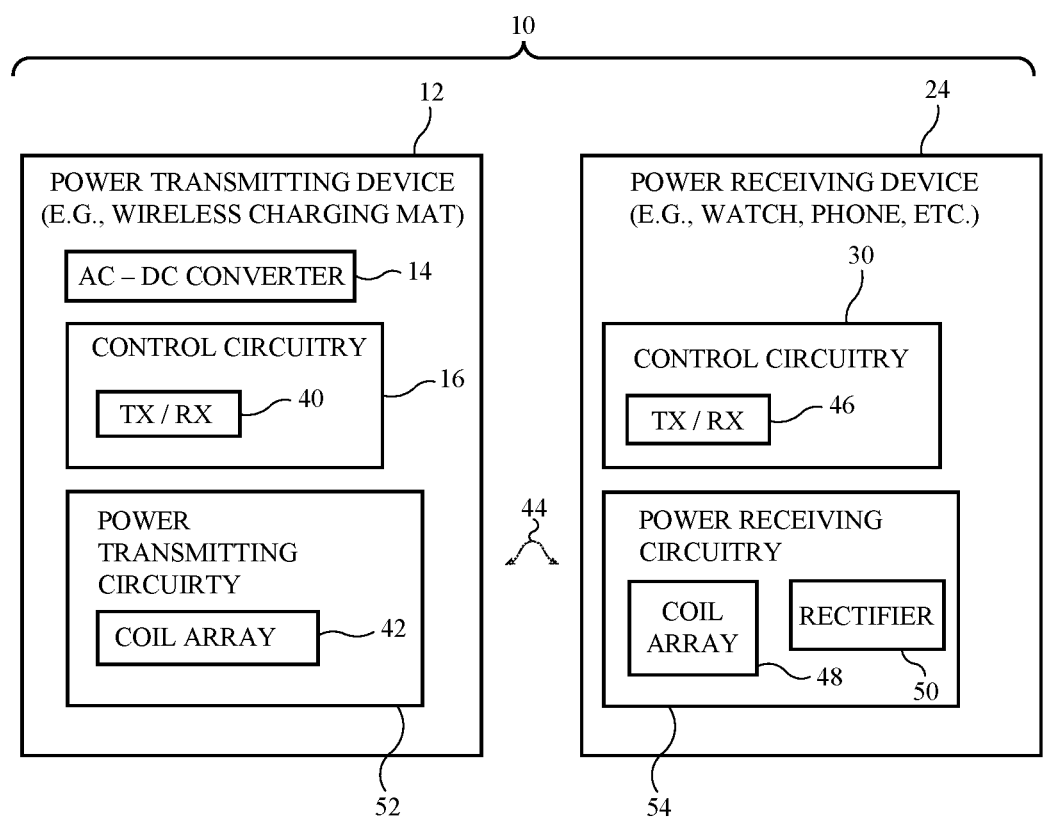
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 10 may include a wireless power transmitting device such as wireless power transmitting device 12 and may include a wireless power receiving device such as wireless power receiving device 24.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat may sometimes be described herein as an example.

Power receiving device 24 may be a portable electronic device such as a wristwatch, a cellular telephone, a laptop computer, a tablet computer, or other electronic equipment. Power transmitting device 12 may be coupled to a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., transistors) that are turned on and off based on control signals provided by control circuitry 16 to create AC current signals through one or more coils in coil array 42. As the AC currents pass through coil array 42, alternating-current electromagnetic fields (signals 44) are produced that are received by corresponding coil array 48 in power receiving device 24. When the alternating-current electromagnetic fields are received by the coil array, corresponding alternating-current voltages are induced in the coil array. Rectifier circuitry such as rectifier 50 may convert received AC signals (received alternating-current voltages associated with wireless power signals) from coil array 48 into DC voltage signals for powering device 24. The DC voltages may be used in powering components in device 24 such as a display, touch sensor components, wireless circuits, audio components, and other components and may be used in charging an internal battery in device 24.

Device 12 and/or device 24 may communicate wirelessly using in-band or out-of-band communications. Device 12 may, for example, have wireless transceiver circuitry 40 that wirelessly transmits out-of-band signals to device 24 using an antenna or that wirelessly transmits in-band signals to device 24 using coil array 42. Wireless transceiver circuitry 40 may be used to wirelessly receive out-of-band signals from device 24 using the antenna or may be used to wirelessly receive in-band signals from device 24 using coil array 42. Device 24 may have wireless transceiver circuitry 46 that transmits out-of-band signals to device 12 using an antenna or that transmits in-band signals to device 12 using coil array 48. Receiver circuitry in wireless transceiver 46 may use an antenna to receive in-band signals from device 12 or may use coil array 48 to receive in-band signals from device 12.

During power transmission operations, coils array 48 supplies received AC voltages (i.e., receive wireless power signals) to rectifier 50. Rectifier 50 contains rectifying components such as synchronous rectification metal-oxide-semiconductor transistors arranged in a bridge network.

Figure 2:
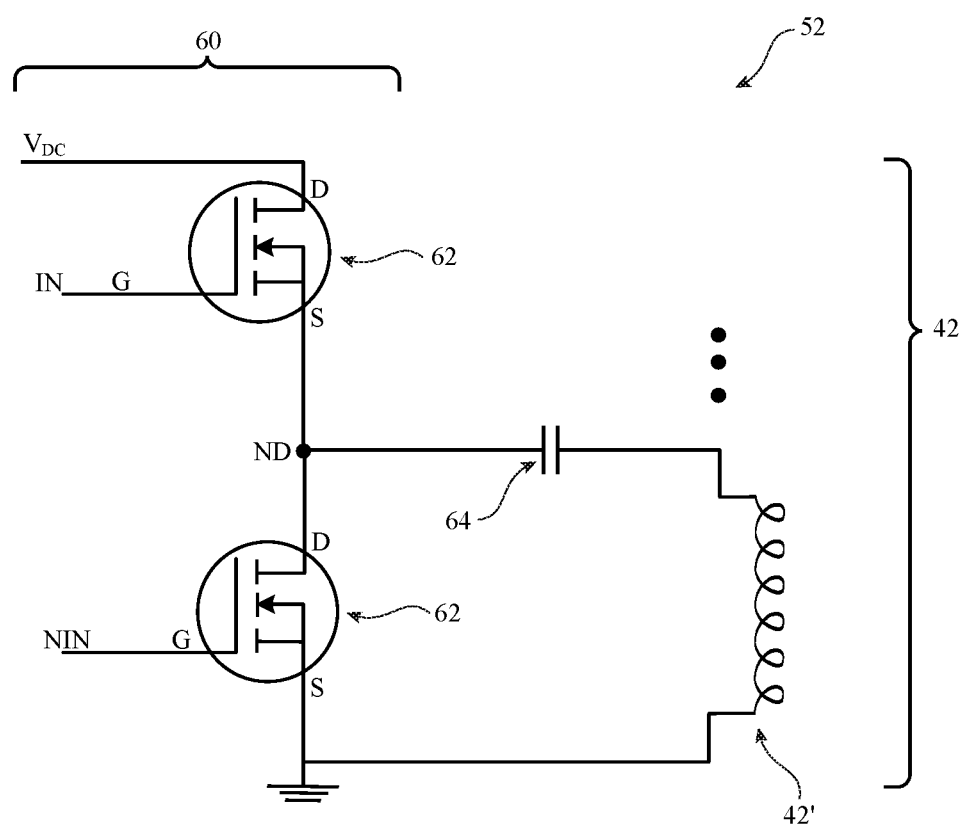
FIG. 2 is a circuit diagram of illustrative wireless power transmitting equipment in accordance with an embodiment.

Illustrative circuitry of the type that may be used for forming power transmitting circuitry 52 of FIG. 1 is shown in FIG. 2. As shown in FIG. 2, power transmitting circuitry 52 may include drive circuitry such as drive circuitry 60 coupled to coils such as coil 42' in coil array 42 (FIG. 1). Drive circuitry 60 may receive direct-current (DC) voltage Vdc from AC-DC converter 14. Drive circuitry 60 may have transistors such as transistors 62 (e.g., metal-oxide-semiconductor transistors or other suitable transistors). Transistors 62 may be coupled in series between a terminal that receives positive power supply voltage Vdc and a ground terminal that receives a ground voltage. Capacitor 64 may be coupled to node Nd between transistors 62. During operation, control circuitry 16 may apply control signals such as control signal IN and complementary (inverted) signal NIN to respective gates G of transistors 62. Control circuitry 16 may modulate signals IN and NIN so that transistors 62 produce an AC drive signal. Capacitor 64 may be used to couple the AC drive signal to a coil such as coil 42' in array 42 that is coupled to transistors 62. As the AC signal flows through coil 42', wireless power signal 44 (FIG. 1) is produced and can be received by coil array 48 of device 24.

Coil array 42 may have an array of wireless power transmitting coils mounted under a planar surface such as a charging mat cover. The array of coils may, for example, contain wireless power transmitting coils that are tiled in a hexagonal tile pattern. Drive circuitry 60 may have a pair of transistors 62 coupled to each coil in coil array 42 and/or may have other switching circuitry (e.g., other transistor circuitry) that can be adjusted by control circuitry 16 to select which coil(s) in array 62 is being used to transmit wireless power signals 44 to device 24.

Figure 3:
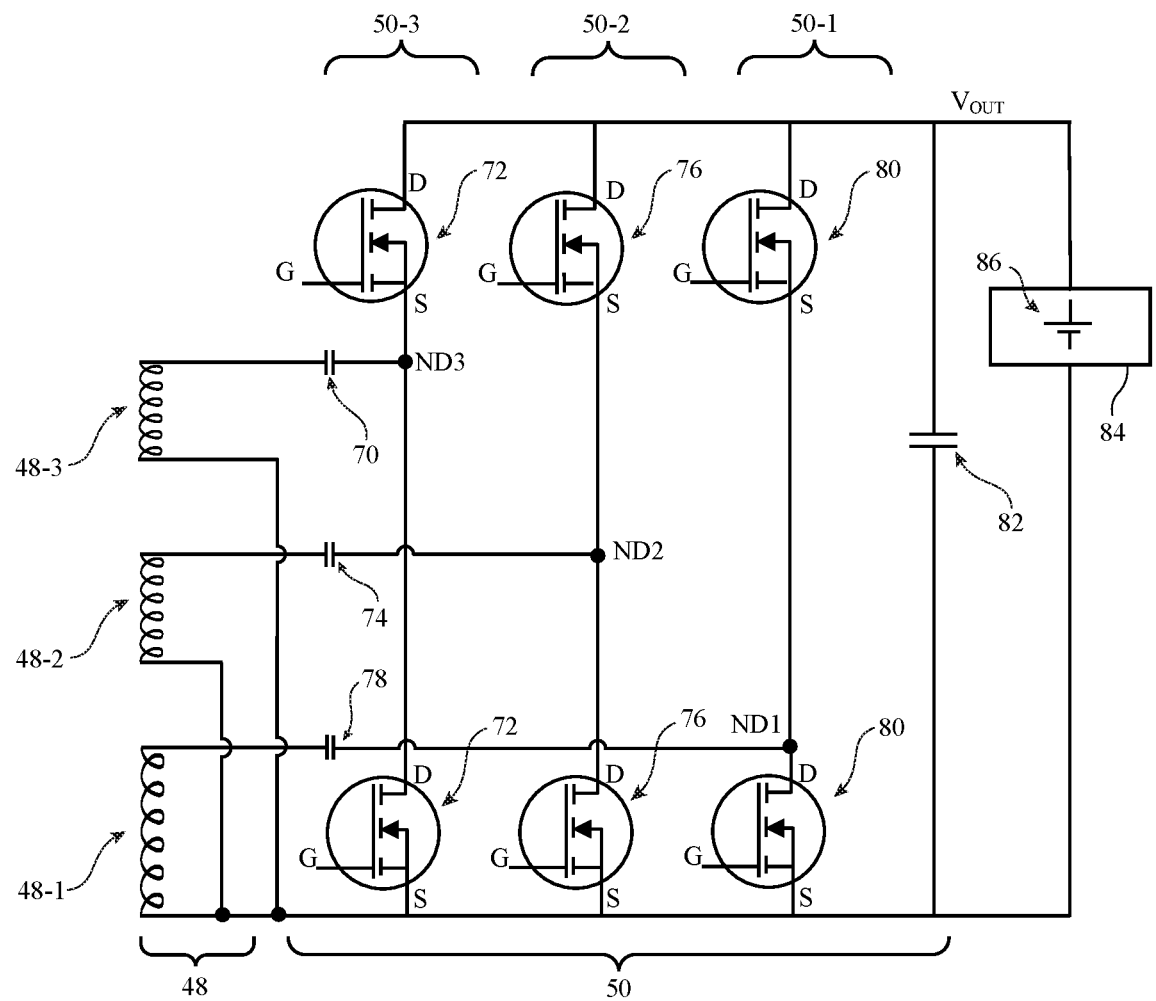
FIG. 3 is a circuit diagram of illustrative wireless power receiving equipment in accordance with an embodiment.

FIG. 3 is a circuit diagram showing illustrative circuitry of the type that may be used in implementing power receiving circuitry 54 in device 24. As shown in FIG. 3, power receiving circuitry 54 may have coil array 48. Coil array 48 may have an array of wireless power receiving coils such as first coil 48-1, second coil 48-2, and third coil 48-3. In general, coil array 48 may have any suitable number of coils (e.g., more than three, more than four, fewer than four, fewer than ten, or other suitable number). Configurations in which coil array 48 contains three wireless power receiving coils may sometimes be described herein as an example.

Rectifier circuitry 50 may have transistors with gates G that are controlled by control signals from control circuitry 30 to implement a synchronous rectification scheme. During operation, the transistors may be turned on and off so that received AC voltages from the received AC wireless signals are converted into DC voltage signal Vout across capacitor 82. The DC voltage Vout may be used in powering internal circuitry 84 in device 24. Circuitry 84 may include control circuitry 30 (FIG. 1), a display, a touch sensor and other input devices, audio circuitry, cellular telephone transceiver circuitry, wireless local area network circuitry, and other wireless transceiver circuitry, a battery such as battery 86, circuitry that directs power to battery 86 (e.g., charging circuitry to recharge battery 86 when battery 86 has become depleted), and circuitry that directs power to other components in internal circuitry 84, etc.

Capacitors 70, 74, and 78 may be coupled between the coils of array 48 and respective rectifier circuits such as independently selectable bridge circuits 50-1, 50-2, and 50-3. Capacitor 78 may be coupled between coil 48-1 and node ND1 in bridge circuit 50-1. Capacitor 74 may be coupled between coil 48-2 and node ND2 in bridge circuitry 50-2. Capacitor 70 may be coupled between coil 48-3 and node ND3 in bridge circuit 50-3. Bridge circuit 50-1 may have transistors such as a pair of transistors 80 that are coupled to each other at node ND1. Transistors 80 may be coupled in series across capacitor 82 of rectifier 50. Bridge circuit 50-2 may have transistors such as a pair of transistors 76 that are coupled to each other at node ND2. Transistors 76 may be coupled in series across capacitor 82 of rectifier 50 in parallel with the pair of transistors 80. Bridge circuit 50-1 may have transistors such as a pair of transistors 72 that are coupled to each other at node ND3. Transistors 72 may be coupled in series across capacitor 82 of rectifier 50 in parallel with the pair of transistors 80 and the pair of transistors 76.

Using this rectifier arrangement, control circuitry 30 can activate bridge circuit 50-1, 50-2, or 50-3 to switch coil 48-1, 48-2, or 48-3 into use, respectively, in receiving wireless signals 44. For example, if it is desired to use coil 48-2 to receive wireless signals 44 from device 12, transistors 76 may be used in a synchronous rectification scheme to rectify received AC wireless signals and thereby produce DC voltage Vout on capacitor 82 at the output of rectifier 50 while transistors 72 and 80 remain off. If, as another example, it is desired to use coil 48-1 to receive wireless signals 44 from device 12, control circuitry 30 may turn transistors 80 on and off to synchronously rectify the AC signals received by coil 48-1 and thereby produce DC voltage Vout. In this way, control circuitry 30 can switch any one of the coils in coil array 48 into use in receiving wireless power. This allows control circuitry 30 to select among multiple coils in array 48 when optimizing coupling with a corresponding coil in array 42.

When device 24 is place on device 12 (e.g., on a wireless charging mat), the coils of coil array 48 overlap the coils in coil array 42. Different coils in array 48 will overlap different portions of the charging mat and therefore will overlap different coils in coil array 42. To optimize wireless power transfer efficiency, device 12 and 24 may determine optimum coils to use in array 42 and 48. For example, device 12 (e.g., control circuitry 16) may have impedance measurement circuitry coupled to the coils of array 42 and/or device 24 (e.g., control circuitry 30) may have impedance measurement circuitry coupled to the coils of coil array 48. By analyzing impedance measurements or otherwise gathering information on the coupling efficiency between each of the coils of array 42 and each of the coils of array 48, an optimum pair of coils can be identified to support charging (e.g., an optimum transmitting coil in array 42 and an optimum receiving coil in array 48).

Device 12 and device 24 may communicate using in-band or out-of-band communications when identifying the optimum transmitting and receiving coils. For example, device 12 and device 24 may coordinate search strategies when cycling through potential transmitting and receiving coils as part of the optimum coil identification process. Once identified, these coils can be switched into use to support wireless power transfer operations. In device 12, control circuitry 16 may use drive circuitry 60 to supply AC drive signals to the optimum transmitting coil in array 42. In device 24, control circuitry 30 may adjust rectifier 50 so that an appropriate bridge circuit (50-1, 50-2, or 50-3) is used in rectifying AC voltage signals from the optimum receiving coil in array 48.

Figure 4:
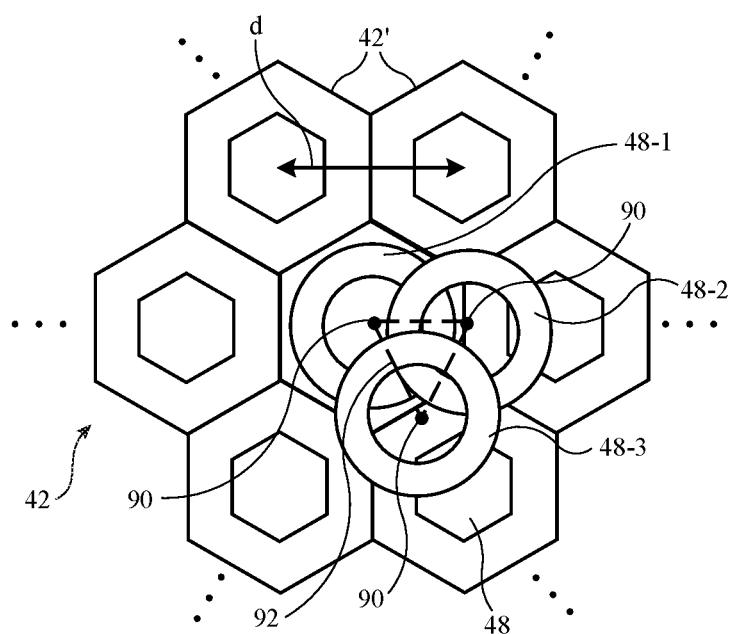
FIG. 4 is a diagram of an illustrative hexagonally tiled array of wireless power transmitting coils of the type that may be used in a wireless power transmitting device and an associated cluster of three laterally offset receiver coils of the type that may be used in a wireless power receiving device in accordance with an embodiment.

FIG. 4 is a top view of coils 42' in coil array 42 and coils 48-1, 48-2, and 48-3 in coil array 48 in an illustrative scenario in which device 24 has been placed on top of device 12. As shown in FIG. 4, coils 42' may be arranged in a hexagonally tiled array. Each tile in the hexagonal array may contain a respective one of coils 42'. Coils 48-1, 48-2, and 48-3 may be arranged in a pattern that does not allow all three of these coils to simultaneously align with three of coils 42', regardless of how device 42 is placed on device 12. For example, the coils of array 48 may be laterally offset from each other so that each coil in array 48 is aligned with a respective vertex 90 of an equilateral triangle such as triangle 92 of FIG. 4. Triangle 92 has sides of length d/2, where d is the center-to-center distance of the hexagonally tiled transmitting coils in array 42. With this type of arrangement, whenever a first receiver coil such as coil 48-1 is aligned with a given transmitter coil 42' in one of the hexagonally tiled regions of array 42, the second and third coils of coil array 48 (coils 48-2 and 48-3, respectively) are not aligned with any of the other transmitter coils 42' in coil array 42.

The use of partly overlapping laterally offset receiver coils in coil array 48 such as the illustrative three coils 48-1, 48-2, and 48-3 of coil array 48 of FIG. 4 is illustrative. Array 48 may be formed from other numbers of coils (e.g., more than three receiver coils, fewer than five receiver coils, etc.) and/or different lateral offset patterns may be used. The two-dimensional array of coils 48-1, 48-2, and 48-3 of FIG. 4 (e.g., coils that are not all arranged in a straight line and that are laterally offset from each other in a two-dimensional pattern that ensures that whenever a first receiver coil such as coil 48-1 is aligned with a given transmitter coil 42', second coil 48-2 and third coil 48-3 will not be aligned with any of the other transmitter coils 42') helps ensure that there will be satisfactory coupling between at least one of these three coils and a corresponding one of the transmitter coils in array 42, even when device 24 is placed in a variety of different orientations. A two-dimensional array of the type shown in FIG. 4 in which each receiver coil is located at the vertex of an equilateral triangle such as triangle 92 of FIG. 4 helps reduce the likelihood that all three receiver coils will be poorly aligned with the hexagonally tiled coils of array 42, thereby ensuring that there is at least one transmitter coil and receiver coil that overlap sufficiently well to support efficient wireless power transfer between device 12 and device 24. The two-dimensional array of coils in coil array 48 of FIG. 4 is also compact and does not involve placement of receiving coils far apart at potentially non-overlapping positions with respect to each other. If desired, receiver coils may be placed farther apart at other triangle vertex locations in a tiled array of triangles 92, while still ensuring that the receiver coils are positioned at a variety of locations relative to the hexagonal tiles of array 42. The configuration of coil array 48 of FIG. 4 is illustrative.

Coils 42' in array 42 and coils 48-1, 48-2, 48-3 in array 48 may be implemented using one or more loops of wire, using one or more loops of metal traces on a printed circuit or other suitable substrate, or may be formed from other looped signal paths. The coils may have circular outlines (footprints when viewed from above), may have hexagonal outlines, may have rectangular outlines, or may have other suitable shapes. The coils may have 2-100 turns, more than 5 turns, more than 15 turns, more than 30 turns, fewer than 75 turns, fewer than 50 turns, or other suitable numbers of turns. The coils may have diameters of 5 mm or more, 10 mm or more, 15 mm or more, 20 mm or more, 30 mm or more, 50 mm or more, 100 mm or less, 60 mm or less, 35 mm or less, or other suitable diameters. The frequency of the AC wireless signals in system 10 (e.g., signals 44) may be 100 kHz to 10 MHz, more than 200 kHz, more than 500 kHz, more than 1 MHz, more than 5 MHz, less than 20 MHz, less than 10 MHz, less than 1 MHz, or other suitable frequency.

The foregoing is merely illustrative and various modifications can be made to the described embodiments. The foregoing embodiments may be implemented individually or in any combination.

What is claimed is:

1. A portable electronic device that is configured to receive wireless power transmitted from an array of tiled transmitting coils in a wireless power transmitting device, wherein the tiled transmitting coils are characterized by a center-to-center spacing, the portable electronic device comprising:
   a battery; and
   wireless power receiving circuitry that includes an array of wireless power receiving coils and that includes rectifier circuitry that is configured to rectify alternating-current wireless power signals received by the array of wireless power receiving coils and to provide a corresponding direct-current voltage to the battery, wherein the wireless power receiving coils are laterally spaced from each other in a two-dimensional array, and wherein first, second, and third wireless power receiving coils of the array of wireless power receiving coils are respectively aligned with first, second, and third vertices of an equilateral triangle that has sides with lengths equal to half of the center-to-center spacing.

2. The portable electronic device of claim 1 further comprising a capacitor to which the direct-current voltage is provided.

3. The portable electronic device of claim 2 wherein the rectifier circuitry includes first, second, and third independently selectable bridge circuits.

4. The portable electronic device of claim 3 wherein the first bridge circuit is coupled between the first wireless power receiving coil and the capacitor, wherein the second bridge circuit is coupled between the second wireless power receiving coil and the capacitor, and wherein the third bridge circuit is coupled between the third wireless power receiving coil and the capacitor.

5. The portable electronic device of claim 4 wherein the first bridge circuit, the second bridge circuit, and the third bridge circuit each include a pair of transistors coupled in series across the capacitor.

6. The portable electronic device of claim 5 further comprising:

a first capacitor interposed between the first wireless power receiving coil and a node between the pair of transistors in the first bridge circuit;

a second capacitor interposed between the second wireless power receiving coil and a node between the pair of transistors in the second bridge circuit; and a third capacitor interposed between the third wireless power receiving coil and a node between the pair of transistors in the third bridge circuit.

7. The portable electronic device defined in claim 1, further comprising a capacitor to which the direct-current voltage is provided, wherein the rectifier circuitry comprises:

a first bridge circuit that comprises first and second transistors coupled in series between a first plate of the capacitor and a second plate of the capacitor;

a second bridge circuit that comprises third and fourth transistors coupled in series between the first plate of the capacitor and the second plate of the capacitor; and a third bridge circuit that comprises fifth and sixth transistors coupled in series between the first plate of the capacitor and the second plate of the capacitor, wherein the portable electronic device further comprises:

a first capacitor having a first plate coupled to the first wireless power receiving coil and a second plate coupled to a node between the first and second transistors;

a second capacitor having a first plate coupled to the second wireless power receiving coil and a second plate coupled to a node between the third and fourth transistors; and a third capacitor having a first plate coupled to the third wireless power receiving coil and a second plate coupled to a node between the fifth and sixth transistors.

8. A wireless charging system, comprising:

a wireless power transmitting device having an array of hexagonally tiled transmitting coils; and a wireless power receiving device having a two-dimensional array of wireless power receiving coils including at least first, second, and third wireless power receiving coils, wherein whenever the first wireless power receiving coil is aligned with any one of the hexagonally tiled transmitting coils, the second and third wireless power receiving coils are not aligned with any of the hexagonally tiled transmitting coils.

9. The wireless charging system of claim 8 wherein the wireless power transmitting device is a wireless charging pad.

10. The wireless charging system of claim 9 wherein the wireless power receiving device comprises a rectifier having three pairs of transistors coupled respectively to the first, second, and third wireless power receiving coils.

11. The wireless charging system of claim 8 wherein the hexagonally tiled transmitting coils are characterized by a center-to-center spacing and wherein the first, second, and third wireless power receiving coils are respectively aligned with first, second, and third vertices of an equilateral triangle that has sides with lengths equal to half of the center-to-center spacing.

12. The wireless charging system of claim 8, wherein the wireless power receiving device comprises a battery, rectifier circuitry that is configured to rectify alternating-current wireless power signals received by the two-dimensional array of wireless power receiving coils and to provide a corresponding direct-current voltage to the battery, and a capacitor to which the direct-current voltage is provided, wherein the rectifier circuitry comprises:

a first bridge circuit that comprises first and second transistors coupled in series between a first plate of the capacitor and a second plate of the capacitor;

a second bridge circuit that comprises third and fourth transistors coupled in series between the first plate of the capacitor and the second plate of the capacitor; and a third bridge circuit that comprises fifth and sixth transistors coupled in series between the first plate of the capacitor and the second plate of the capacitor, wherein the wireless power receiving device further comprises:

a first capacitor having a first plate coupled to the first wireless power receiving coil and a second plate coupled to a node between the first and second transistors;

a second capacitor having a first plate coupled to the second wireless power receiving coil and a second plate coupled to a node between the third and fourth transistors; and a third capacitor having a first plate coupled to the third wireless power receiving coil and a second plate coupled to a node between the fifth and sixth transistors.

* * * * *